United States Patent
Beck et al.

(10) Patent No.: US 8,152,223 B2
(45) Date of Patent: Apr. 10, 2012

(54) SIDEWALL FOR A MOTOR VEHICLE

(75) Inventors: Markus Beck, Elchingen (DE); Steffen Dingfelder, Sindelfingen (DE); Karl-Heinz Fueller, Neu-Ulm (DE); Berthold Hopf, Eberdingen (DE); Oliver Quirin, Ulm (DE); Oliver Roecker, Koengen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 12/877,394

(22) Filed: Sep. 8, 2010

(65) Prior Publication Data

US 2011/0057476 A1    Mar. 10, 2011

(30) Foreign Application Priority Data

Sep. 9, 2009   (DE) .................. 10 2009 040 735

(51) Int. Cl.
 *B62D 33/00*   (2006.01)

(52) U.S. Cl. .................................................. 296/181.1
(58) Field of Classification Search ............. 296/181.1, 296/181.2, 193.05
See application file for complete search history.

(56) References Cited

U.S. PATENT DOCUMENTS

| | | | | |
|---|---|---|---|---|
| 5,934,745 | A * | 8/1999 | Moore et al. | 296/193.04 |
| 6,648,404 | B2 * | 11/2003 | Yakata et al. | 296/203.03 |
| 6,910,732 | B2 * | 6/2005 | Miyoshi et al. | 296/193.05 |
| 7,540,085 | B2 * | 6/2009 | Fenton et al. | 296/181.1 |
| 7,850,226 | B2 * | 12/2010 | Hedderly | 296/193.05 |
| 7,914,068 | B2 * | 3/2011 | Mizohata | 296/193.05 |
| 2005/0189790 | A1 * | 9/2005 | Chernoff et al. | 296/193.05 |
| 2011/0187155 | A1 * | 8/2011 | Ameloot et al. | 296/193.05 |

* cited by examiner

*Primary Examiner* — Lori Lyjak
(74) *Attorney, Agent, or Firm* — Crowell & Moring LLP

(57) ABSTRACT

A side wall for a motor vehicle has an inside shell made of steel plate and an outside covering connected with (particularly welded to) the inside shell. The outside covering comprises an inside panel made of a steel alloy and an outside panel.

8 Claims, 1 Drawing Sheet

SIDEWALL FOR A MOTOR VEHICLE

BACKGROUND AND SUMMARY OF THE INVENTION

This application claims the priority of German patent document 10 2009 040 735.9, filed Sep. 9, 2009, the disclosure(s) of which is (are) expressly incorporated by reference herein.

The invention relates to a side wall structure for a motor vehicle.

Side walls for motor vehicles usually comprise an inside shell made of steel plate and an outside covering connected to the inside shell. In order to simplify joining of the outside covering to the inside shell, the outside covering is itself usually constructed of steel. This permits a one-sided joining from the direction of the passenger compartment (for example, by beam welding). However, outside covering parts made of steel have the disadvantage of being very heavy. Previous attempts to provide an outside covering made of lighter materials also disadvantageously led to complex joining sequences and the necessity of using a plurality of connection elements.

It is therefore an object of the present invention to provide a vehicle side wall with reduced weight, and simultaneously a simple joining of the side wall is made possible.

This and other objects and advantages are achieved by the motor vehicle side wall according to the invention, which comprises an inside shell made of steel plate and an outside covering connected with the latter, particularly welded to the latter. The outside covering comprises an inside panel made of a steel alloy and an outside panel. By constructing the inside panel of steel, it becomes possible to maintain the previously customary joining sequence when connecting the outside covering with the inside shell. As a result, no complex changes in the manufacturing process will be necessary for using the side wall according to the invention. At the same time, the weight is reduced by constructing the outside panel of a material that has a lower weight than steel.

The outside panel is preferably glued together with the inside panel. By means of the adhesive layer, an electrochemical insulation is ensured in addition to a good hold between the panels. No contact corrosion problems will therefore occur between the aluminum sheet and the steel plate.

In order to provide the outside covering with particularly good strength, the outside panel is, in addition, preferably connected with the inside panel by way of at least one mechanical joining device. In an especially preferred embodiment, this is a solid punch rivet.

In a further embodiment of the invention, the outside covering part is welded to the inside shell by a one-sided welding process. In this case, the welding access preferably takes place from the side of the inside panel—thus from the side of the passenger compartment of the vehicle body. As a result, the usual joining sequence for the linking of side walls to body shells is maintained, so that a side wall constructed in this manner can be integrated particularly easily in existing production lines.

In a further embodiment of the invention, a B-column of the side wall is formed exclusively by the outside covering. The inside steel panel of the outside covering provides the B-column with sufficient strength, so that a further support by the inside shell of the side wall is unnecessary, thereby further reducing weight.

In preferred embodiments, the outside panel consists of an aluminum base alloy or a plastic material, both of which are particularly advantageous from the light-weight construction angle.

Other objects, advantages and novel features of the present invention will become apparent from the following detailed description of the invention when considered in conjunction with the accompanying drawings.

DETAILED DESCRIPTION OF THE DRAWINGS

Figure 1:
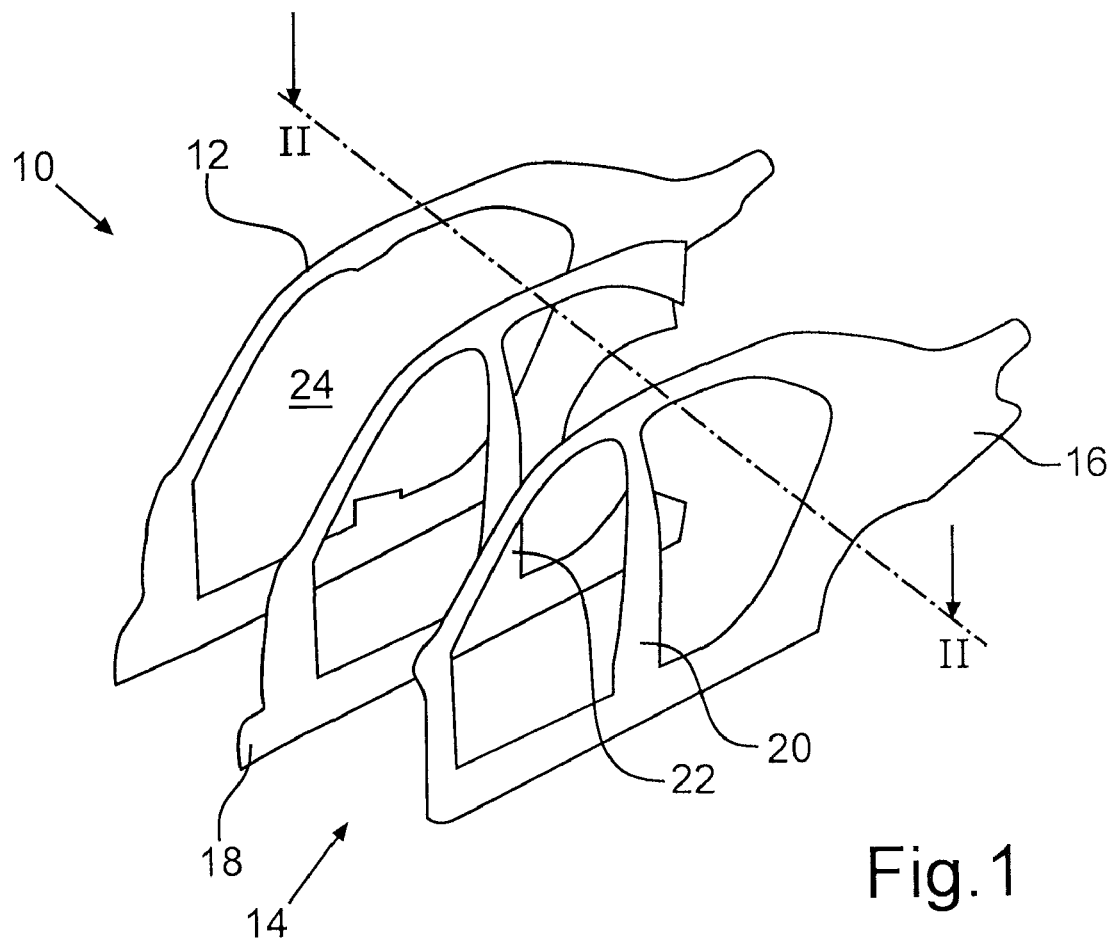
FIG. 1 is an exploded view of an embodiment of a side wall according to the invention.

As shown in FIG. 1, a side wall for a motor vehicle (which as a whole has the reference number 10) comprises an inside shell 12 made of steel plate as well as an outside covering which, as a whole, has the reference number 14. In this case, the outside covering 14 has a two-layer construction and comprises an outside panel 16 and an inside panel 18 made of steel. The outside panel 16 will later form the actual skin of the motor vehicle. In this embodiment, the outside panel consists of an aluminum base alloy; however, as an alternative, it may also consist of a plastic material. The latter has similarly advantageous characteristics with respect to weight reduction potentials.

The outside panel 16 comprises a B-column element 20. A further B-column element 22 is provided on the inside panel 18. In contrast, the inside shell 12 of the outside wall 10 has a single continuous door entrance 24 in which no B-column is provided. The forming of the outside panel 16 of an aluminum alloy can reduce weight when such a side wall 10 is produced. In addition, more weight is saved by the elimination of a B-column element on the inside shell 12. The construction of the inside panel 18 of a steel plate, particularly of a high-strength steel alloy provides the final B-column of the motor vehicle, which is formed of the B-column elements 20 and 22, with sufficient stability.

Figure 2:
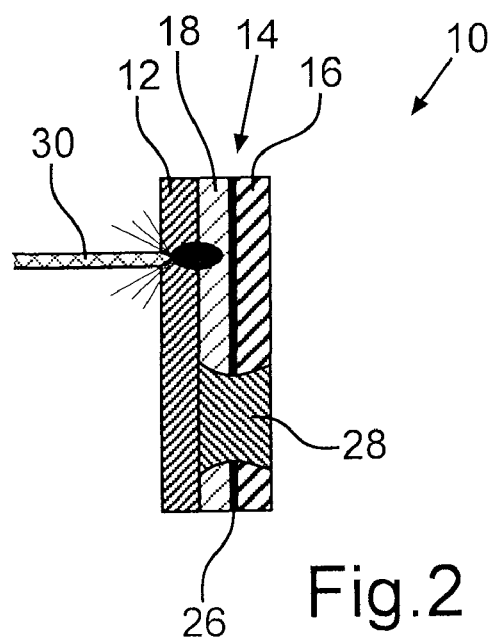
FIG. 2 is a sectional view of the side wall of FIG. 1.

During the manufacturing of the side wall 10, the inside panel 18 is first glued together with the outside panel 16 of the outside covering 14. The resulting adhesive layer 26 between the two panels 16, 18 (as seen in FIG. 2) simultaneously provides an electrochemical insulation of the two panels 16, 18 with respect to one another, so that no contact corrosion can occur. For further reinforcement of the connection, solid punch rivets 28 are placed between the panels, so that simultaneously a material-locking and a form-fitting connection is obtained between the panels 16, 18.

As a result of the combination of the mechanical joining technique in the form of solid punch rivets 28 and the application of an adhesive layer 26, the problem of contact corrosion and the problems of the different coefficients of thermal expansion of the steel and aluminum materials, which would have a negative effect during a thermal joining operation, can be solved simultaneously.

The preparation of the outside covering 14 takes place parallel to the main production line on which the body shell with the inside shell 12 of the outside wall 10 is provided. After attaching the thus glued-together panels 16, 18 to the inside shell 12 of the outside wall 10, the outside covering 14 is finally welded together with the inside shell 12. This takes place from the direction of the occupant compartment, in which case a welding beam, particularly a laser beam 30, penetrates the material of the inside shell 12 and partially starts to melt the material of the inside panel 18 of the outside covering 14, so that a material-locking connection is obtained between the two panels 12 and 18. The welding-together preferably takes place in a laser-guided manner, so that the complete assembly of the outside wall 10 can be automated.

The joining of the outside covering 14 to the inside shell 12, in this case, corresponds precisely to the joining operation between a conventional outside steel covering with the inside shell, so that no changes need be made at the main production line for the production of a side wall 10. Only the secondary line is changed, on which the gluing and riveting between the outside panel 16 and the inside panel 18 of the outside covering 14 takes place. The production of the outside wall 10 can therefore be integrated without any problems in already existing production lines.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A side wall for a motor vehicle, said side wall comprising:
   an inside shell made of steel plate; and
   an outside covering which covers and is connected to this inside shell;
   wherein the outside covering is made of a two layer sandwich construction that comprises an inside panel made of a steel alloy, and an outside panel.

2. The side wall according to claim 1, wherein the outside panel is glued to the inside panel.

3. The side wall according to claim 1, wherein the outside panel is connected with the inside panel by at least one mechanical joining device.

4. The side wall according to claim 1, wherein the outside covering is welded to the inside shell by a one-sided welding operation.

5. A side wall for a motor vehicle, said side wall comprising:
   an inside shell made of steel plate; and
   an outside covering connected to this inside shell;
   wherein the outside covering comprises an inside panel made of a steel alloy, and an outside panel; and
   wherein a B-column of the side wall is formed exclusively by the outside covering.

6. The side wall according to claim 1, wherein the outside panel is made of an aluminum base alloy.

7. The side wall according to claim 1, wherein the outside panel is made of a plastic material.

8. A motor vehicle having a side wall comprising:
   an inside shell made of steel plate; and
   an outside covering which covers and is connected to this inside shell;
   wherein the outside covering is made of a two layer sandwich construction that comprises an inside panel made of a steel alloy, and an outside panel.

* * * * *